United States Patent Office 3,049,408
Patented Aug. 14, 1962

3,049,408
STABILIZATION OF HYDROGEN CYANIDE
Edward H. Gause, Texas City, Tex., assignor to Monsanto Chemical Company, St. Louis, Mo., a corporation of Delaware
No Drawing. Filed May 12, 1960, Ser. No. 28,551
6 Claims. (Cl. 23—151)

The present invention relates to the stabilization of liquified hydrogen cyanide against polymerization and decomposition. It particularly relates to an inhibitor compound for the stabilization of liquified hydrogen cyanide.

When liquified hydrogen cyanide is stored without stabilization treatment it changes color after a short period of time. It passes through the various shades from faint amber to dark opaque brown and in the meantime tends to become solid, with a release of gaseous products including ammonia. This change in color and form with the accompanying release of gas may be considered as substantially polymerization of the hydrogen cyanide accompanied by decomposition. It is believed this reaction is, in general, promoted by both the polymerization and decomposition products produced during the reaction and initially by the presence of impurities such as alkaline substances. The polymerization reaction is highly exothermic and is accelerated by increased temperatures. Therefore, once polymerization increases, the amount of heat progressively increases causing more polymerization which in turn causes more heat, etc. If the liquid hydrogen cyanide is stored in tanks or other sealed containers the pressure may be very quickly increased to as high as 1000 p.s.i. or higher, e.g., within a few seconds. This, of course, without some method for pressure relief, will cause the sealed container or tank to explode. Such an explosion is extremely dangerous to human life not only because of the explosion itself but also because of the poisonous nature of the hydrogen cyanide vapors released by the explosion.

Inhibitors which have been used in the stabilization of hydrogen cyanide are acidic in nature. Compounds such as mineral acids, e.g., sulfuric acid and gases thereof as $SO_2$, oxalate salts, and such compounds as cyanogen halides have been proposed as stabilizers. These latter compounds have not proved to be satisfactory because of the low vapor pressures of such compounds.

It is an object of this invention to provide a method for the stabilization of hydrogen cyanide. It is a further object of this invention to provide a compound for the inhibition of hydrogen cyanide against polymerization and decomposition. Additional objects will become apparent from the description of invention disclosed herein.

It has been discovered in fulfillment of these objects that oxides of nitrogen, e.g., nitrous oxide and nitric oxide, when added in sufficient amounts to liquified hydrogen cyanide will prevent its polymerization and decomposition.

To illustrate the effectiveness of this invention the following example is given. It is to be understood, of course, that this example is not to be construed in any manner is limiting the applications or conditions of this invention.

*Example*

Seventy ml. of liquified hydrogen cyanide were placed in a sealed container and heated to a uniform temperature of 175° C. The temperature was carefully observed for the rise in temperature which would be indicative of the beginning of polymerization. The time between the reaching of the 175° initial temperature and beginning of the polymerization reaction was recorded as the incubation period. This time period was found to be 18 minutes.

A second 70 ml. sample of the same hydrogen cyanide was placed in the sealed container and an amount of NO equivalent to 90 p.p.m. of the NO-HCN mixture was added. The container was once more heated to 175° C. and the incubation period recorded. The incubation period was found to be 28 minutes. This represents a 55.5% increase in the time necessary for polymerization to begin at 175° C. When the severe test conditions are considered, this is a very significant improvement.

In the practice of the present invention, amounts of oxides of nitrogen ranging from 50 to 1000 or greater p.p.m. of the hydrogen cyanide-oxides of nitrogen mixture may be used. A practical and preferred range of oxide of nitrogen concentration in the hydrogen cyanide-nitrogen oxide mixture is from 50 to 500 parts per million.

One important advantage to using an oxide of nitrogen over many of the stabilizers is that it penetrates and stabilizes the gaseous as well as the liquid phase of the hydrogen cyanide. This is important since it is probable that one cause for failure of many known acid stabilizers has been due to their low vapor pressures which prevent their entering and stabilizing the vapor phase. The high vapor pressure of the oxides of nitrogen insures a sufficient concentration of this substance in the vapor phase to effect stabilization of the vapor as well as of the liquid.

What is claimed is:

1. In the process of inhibiting the polymerization and decomposition of stored liquid hydrogen cyanide the improvement comprising adding at least one oxide of nitrogen to the hydrogen cyanide.
2. The process according to claim 1 wherein the oxide of nitrogen is added in an amount equivalent to 50 to 1000 parts per million of the hydrogen cyanide-nitrogen oxide mixture.
3. The process according to claim 1 wherein the oxide of nitrogen is added in an amount equivalent to 50 to 500 parts per million of the hydrogen cyanide-nitrogen oxide mixture.
4. The process according to claim 1 wherein the oxide of nitrogen is NO.
5. The process according to claim 1 wherein the oxide of nitrogen is $NO_2$.
6. In the process of inhibiting the polymerization and decomposition of stored liquid hydrogen cyanide, the improvement comprising adding $N_2O$.

References Cited in the file of this patent

UNITED STATES PATENTS 2,884,308  Fierce et al. _____ Apr. 28, 1959

FOREIGN PATENTS 254,747  Great Britain _____ Aug. 18, 1927

OTHER REFERENCES

Lowry: "Inorganic Chemistry," Macmillan and Co. Ltd., London, 2nd Edition, 1931, pages 459–460.